US010811155B2

(12) United States Patent
Grossnickle et al.

(10) Patent No.: US 10,811,155 B2
(45) Date of Patent: Oct. 20, 2020

(54) PLASMA PINCH NEUTRON GENERATORS AND METHODS OF GENERATING NEUTRONS

(71) Applicant: THE BOEING COMPANY, Chicago, IL (US)

(72) Inventors: James A. Grossnickle, Bellevue, WA (US); Dejan Nikic, Seattle, WA (US); Mark J. Clemen, Jr., Port Orchard, WA (US)

(73) Assignee: THE BOEING COMPANY, Chicago, IL (US)

( * ) Notice: Subject to any disclaimer, the term of this patent is extended or adjusted under 35 U.S.C. 154(b) by 78 days.

(21) Appl. No.: 15/421,187

(22) Filed: Jan. 31, 2017

(65) Prior Publication Data

US 2018/0220519 A1 Aug. 2, 2018

(51) Int. Cl.
| | | |
|---|---|---|
| *G21G 4/02* | (2006.01) | |
| *H05H 3/06* | (2006.01) | |
| *H05H 1/06* | (2006.01) | |
| *G21B 1/05* | (2006.01) | |
| *G01N 23/00* | (2006.01) | |

(52) U.S. Cl.
CPC ............ *G21G 4/02* (2013.01); *G21B 1/05* (2013.01); *H05H 1/06* (2013.01); *H05H 3/06* (2013.01); *G01N 23/005* (2013.01); *Y02E 30/126* (2013.01)

(58) Field of Classification Search
CPC ... G21G 4/02; H05H 1/06; H05H 3/06; G21B 1/05
See application file for complete search history.

(56) References Cited

U.S. PATENT DOCUMENTS

| 2,735,019 | A | * | 2/1956 | Dewan | H05H 3/06 310/301 |
|---|---|---|---|---|---|
| 3,496,358 | A | * | 2/1970 | John | G01N 23/09 250/391 |
| 3,579,028 | A | * | 5/1971 | Paine | H05H 1/52 376/145 |
| 3,946,240 | A | * | 3/1976 | Roberts | H05H 1/22 250/493.1 |
| 4,912,731 | A | * | 3/1990 | Nardi | H05H 1/52 313/231.41 |
| 5,135,704 | A | * | 8/1992 | Shefer | H05H 3/06 376/108 |
| 5,296,712 | A | * | 3/1994 | Swanson | G01T 3/08 250/390.02 |
| 6,541,786 | B1 | * | 4/2003 | Partlo | B82Y 10/00 250/504 R |
| 8,212,456 | B1 | | 7/2012 | Moore et al. | |
| 15,421,130 | | | 1/2017 | Grossnickle | |
| 2009/0065712 | A1 | | 3/2009 | Zillmer et al. | |

(Continued)

OTHER PUBLICATIONS

"Effects of a Conducting Wall on Z-Pinch Stability" IEEE Transactions on Plasma Science, vol. 42, No. 6, Jun. 2014, pp. 1531-1543. (Year: 2014).*

(Continued)

*Primary Examiner* — Sharon M Davis
(74) *Attorney, Agent, or Firm* — Moore IP Law

(57) ABSTRACT

A neutron generator includes a fuel source configured to provide a neutron-producing fuel. The neutron generator includes a plasma confinement device coupled to the fuel source and configured to generate a z-pinch of the neutron-producing fuel.

27 Claims, 10 Drawing Sheets

(56) References Cited

U.S. PATENT DOCUMENTS

| | | | |
|---|---|---|---|
| 2010/0061500 A1* | 3/2010 | Lou | H05H 6/00 |
| | | | 376/114 |
| 2010/0215136 A1 | 8/2010 | Rusnak et al. | |
| 2013/0336437 A1 | 12/2013 | Dent, Jr. | |
| 2017/0018318 A1* | 1/2017 | Radel | H05H 3/06 |
| 2017/0133114 A1 | 5/2017 | Radel et al. | |
| 2018/0220519 A1 | 8/2018 | Grossnickle et al. | |
| 2018/0254593 A1 | 9/2018 | Clemen, Jr. et al. | |
| 2019/0277268 A1 | 9/2019 | Nikic et al. | |

OTHER PUBLICATIONS

Mather, J. W. and Bottoms, P. J. "Characteristics of the Dense Plasma Focus Discharge" The Physics of Fluids 1968, 11, pp. 611-618. (Year: 1968).*

Golingo, R.P., et al., "Formation of a sheared flow Z pinch," Aerospace and Energetics Research Program, Phys. Plasmas, vol. 12, 2005, American Insitute of Physics, 10 pgs.

Golingo, R., "Formation of a Sheared Flow Z-Pinch," Dissertation submitted for Doctor of Philosophy, University of Washington, 2003, 119 pgs.

Shumlak, U., et al., "The Sheared Flow Stabilized Z-Pinch," Fusion Science and Technology, vol. 61, No. 1T, Jan. 2012, pp. 119-124.

"Measurements of residual stress in materials using neutrons," Jun. 2005, International Atomic Energy Agency, 99 pgs.

Domanus, J. C., et al., "Practical Neutron Radiography," The Neutron Radiography Working Group, Jan. 1992, Kluwer Academic Publishers, Boston, MA, 289 pgs.

Swinth, K. L., et al., "Low-Flux Neutron Imaging," Sep. 1973, Battelle, Pacific Northwest Laboratories, Richland, WA, 10 pgs.

Knecht, et al.,"Effects of a Conducting Wall on Z-Pinch Stability", IEEE Transactions on a Plasma Science, vol. 42, No. 6, Jun. 2014, pp. 1531 through 1543.

Reinovsky, "Pulsed power hydrodynamics: A discipline offering high precision data for motivating and validating physics models", In 2005 IEEE Pulsed Power Conference, pp. 29-36. IEEE, 2005. (Year: 2005).

Rovang, "Pulsed-coil magnet systems for applying uniform 10-30 T fields to centimeter-scale targets on Sandia's Z facility", Review of Scientific Instruments 85, No. 12 (2014): 124701. (Year: 2014).

* cited by examiner

PLASMA PINCH NEUTRON GENERATORS AND METHODS OF GENERATING NEUTRONS

FIELD OF THE DISCLOSURE

The present disclosure relates to neutron generators.

BACKGROUND

Z-pinch plasma devices are used to study fusion as an energy source. A z-pinch plasma device that is used as an energy source typically employs aneutronic fusion to generate energy, and aims to produce more energy than the amount of energy the z-pinch plasma device consumes. Aneutronic fusion uses materials selected to produce few neutrons (e.g., as few as possible within operational constraints) since neutrons released from such experiments can be problematic. Z-pinch plasma devices that employ aneutronic fusion do not produce sufficient neutrons to perform neutron radiography.

SUMMARY

In a particular implementation, a neutron generator includes a fuel source configured to provide a neutron-producing fuel. The neutron generator includes a plasma confinement device coupled to the fuel source and configured to generate a z-pinch of the neutron-producing fuel.

In a particular implementation, a method of generating neutrons includes injecting neutron-producing fuel into a plasma confinement device and releasing neutrons by generating a z-pinch of the neutron-producing fuel within the plasma confinement device.

In a particular implementation, a neutron generator includes an outer electrode and an inner electrode within an interior of the outer electrode. The neutron generator includes a reaction chamber within the interior of the outer electrode. The neutron generator includes a power supply electrically coupled to the outer electrode and the inner electrode, wherein the power supply is configured to generate a voltage differential between the outer electrode and the inner electrode. The neutron generator includes a fuel source configured to provide neutron-producing fuel, wherein the neutron-producing fuel is configured to undergo ionization to produce a z-pinch within the reaction chamber, wherein the z-pinch is configured to undergo a thermonuclear fusion reaction.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Examples of devices and methods described herein release, produce, radiate, propagate, or generate neutrons using plasma confinement of a neutron-producing fuel (e.g., gas). The neutron-producing fuel is compressed into compact plasma utilizing a self-reinforcing magnetic field referred to as a z-pinch. The plasma undergoes thermonuclear fusion (e.g., neutronic fusion), which releases, produces, radiates, propagates, or generates neutrons. Some implementations of the devices and methods described herein produce an amount of nuclear energy that is less than an amount of energy consumed by the implementations of the devices and methods.

Figure 1:
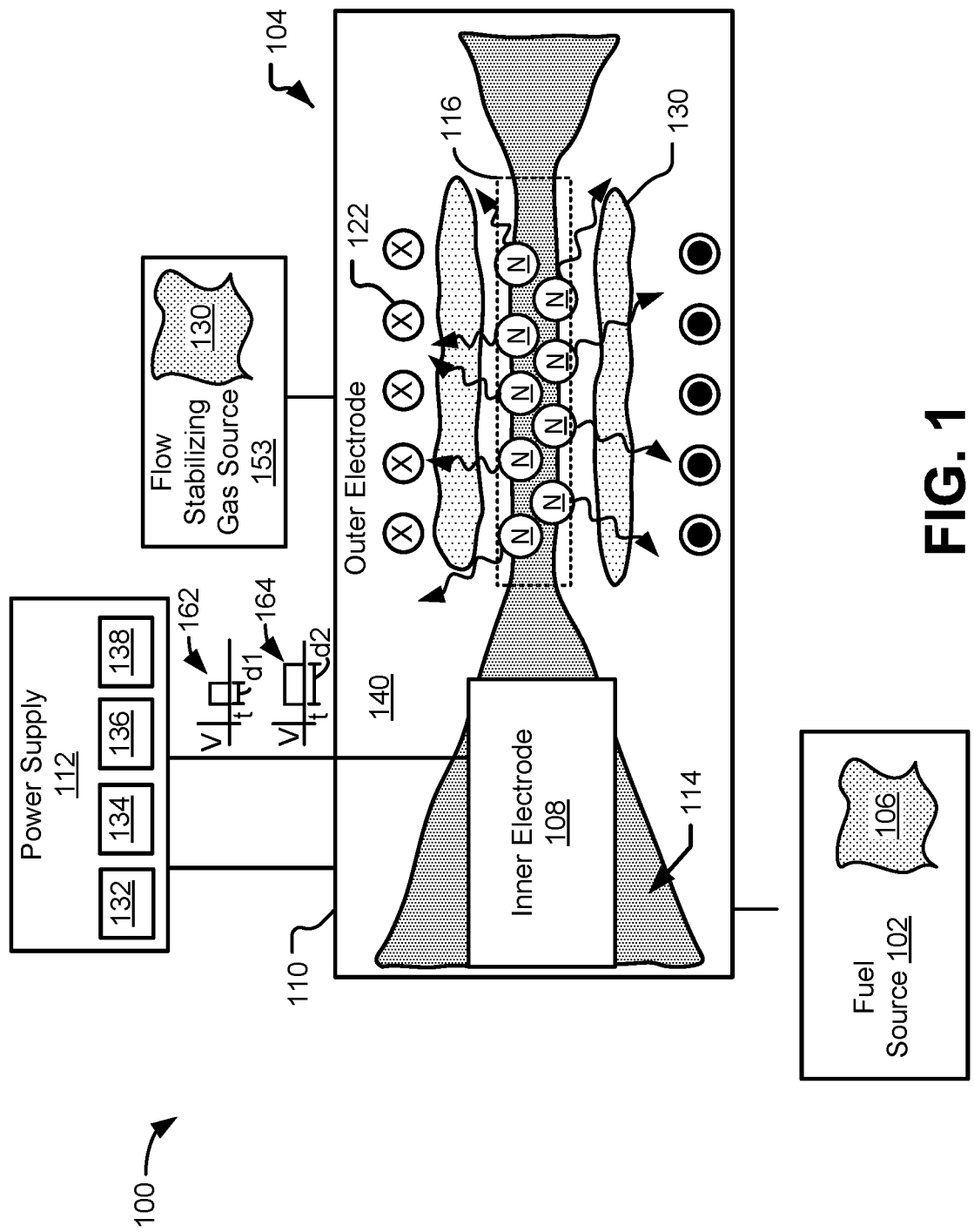
FIG. 1 illustrates a block diagram of an example of a neutron generator configured to generate neutrons using a z-pinch of a neutron-producing fuel.

FIG. 1 illustrates a block diagram of an example of a neutron generator 100 that utilizes plasma confinement for neutron generation. In the example illustrated in FIG. 1, the neutron generator 100 includes a fuel source 102 and a plasma confinement device 104. The fuel source 102 is configured to provide a neutron-producing fuel 106. The neutron-producing fuel 106 is a gas that will experience a neutronic (e.g., as opposed to aneutronic) fusion reaction. In some examples, the neutron-producing fuel 106 includes or corresponds to deuterium, tritium, or both deuterium and tritium.

In some examples, the fuel source 102 corresponds to a neutron-producing fuel 106 stored in a container or other storage apparatus. The plasma confinement device 104 includes an inner electrode 108 and an outer electrode 110. The inner electrode 108 is located within an interior 140 of the outer electrode 110. In some examples, as described in more detail below with reference to FIGS. 3-8, the inner electrode 108 is a hollow cylinder. Alternatively or additionally, in some examples, as described in more detail below with reference to FIGS. 3-8, the outer electrode 110 is a hollow cylinder.

The neutron generator 100 additionally includes a power supply 112 coupled to the outer electrode 110 and to the inner electrode 108. In some examples, the power supply 112 includes a fission reactor 132, a battery 134, a capacitor bank 136, or a flywheel energy storage device 138. The power supply 112 is configured to apply a voltage differential across the outer electrode 110 and the inner electrode 108. In some examples, the power supply 112 is configured to apply the voltage differential using one or more voltage pulses. For example, the power supply 112 may be configured to apply the voltage differential using a voltage pulse 162 (e.g., a first voltage pulse) having a pulse length d1. In some examples, the pulse length d1 is at least one millisecond. In some examples, the pulse length d1 is at least one second. In some examples, the power supply 112 is configured to apply the voltage differential using voltage pulses having different pulse lengths. For example, in some implementations, the power supply 112 is configured to apply the voltage pulse 162 and to apply a voltage pulse 164 having a pulse length d2 that is different than the pulse length d1 of the voltage pulse 162.

During operation, the neutron-producing fuel 106 is injected into the interior 140 of the outer electrode 110. Subsequent to or concurrent with injecting the neutron-producing fuel 106 into the outer electrode 110, the power supply 112 is activated, causing the power supply 112 to apply a high voltage differential across the outer electrode 110 and the inner electrode 108. In response to application of the high voltage differential, an electric arc forms between the outer electrode 110 and the inner electrode 108, causing the neutron-producing fuel 106 within the plasma confinement device 104 to ionize into a plasma 114 that is capable of conducting current. Once the neutron-producing fuel 106 ionizes into the plasma 114, continued application of the high voltage differential causes a current to flow through the plasma 114. Current flowing through the plasma 114 creates a magnetic field 122 within the plasma confinement device 104 that squeezes or compresses portions of the plasma 114 to form a z-pinch 116. The z-pinch 116 is self-reinforcing, with the current flowing through the plasma 114 creating the magnetic field 122, and the magnetic field 122 in turn further compressing the plasma 114 formed from the neutron-producing fuel 106 in the region of the z-pinch 116. Thus, the plasma confinement device 104 is configured to generate a z-pinch 116 of the neutron-producing fuel 106. In some examples, the z-pinch 116 is at least 1 meter in length. In some examples, the z-pinch 116 is at least one half meter (0.5 m) in length.

Although the fuel source 102 is illustrated as being located outside of the plasma confinement device 104 in FIG. 1, in other examples, the fuel source 102 is located within the plasma confinement device 104. In these examples, the fuel source 102 corresponds to a wire or an array of wires disposed within an interior 140 of an outer electrode 110 of the plasma confinement device 104 (e.g., the fuel source 102 is a wire fuel source). In wire fuel source examples, the neutron generator 100 is configured to vaporize at least a portion of the fuel source 102 (e.g., to vaporize at least a portion of the wire or the array of wires) by flowing current through the wire or the array of wires responsive to application of the voltage differential described below. Thus, in some implementations, the fuel source 102 includes a wire or wire array located within the plasma confinement device 104 that is configured to vaporize responsive to application of the voltage differential to provide the neutron-producing fuel 106, and the z-pinch 116 may be referred to as a wire pinch, a wire plasma pinch, or a wire z-pinch.

In some examples, the z-pinch 116 corresponds to a sheared-flow stabilized z-pinch. A sheared-flow stabilized z-pinch is a z-pinch that is stabilized by a flow (e.g., a continuous flow) of gas (e.g., gas 130) outside (e.g., immediately outside) of the z-pinch 116. In these examples, the neutron generator 100 is configured to inject gas 130 (e.g., a neutral gas) into the interior 140 of the outer electrode 110. In some implementations of these examples, the single-use neutron generator 100 includes a flow-stabilizing gas source 153 that is separate from the fuel source 106 to provide the gas 130. In other implementations, the gas 130 may be provided by the fuel source 102 (e.g., the gas 130 may correspond to the neutron-producing fuel 106), in which case the neutron generator 100 does not include the flow stabilizing gas source 153 (e.g., the fuel source 102 serves as a flow stabilizing gas source). Flow of the injected gas 130 proximate to the z-pinch induces a sheared flow of the plasma 114 that stabilizes the z-pinch without using close fitting walls or axial magnetic fields, thereby enabling the z-pinch to remain stable. The flow of the injected gas 130 has a sheared-flow velocity profile in the sense that the gas 130 flows at different velocity at the immediate edge of the z-pinch 116 than it does at radial distances farther from the z-pinch 116. In some examples, the z-pinch is stabilized for more than one second. In some examples, the injected gas 130 fuels the z-pinch. In some implementations in which the injected gas 130 fuels the z-pinch, the gas 130 corresponds to or is formed of the same gas or gases that form the neutron-producing fuel 106.

Continued application of the high voltage differential once the plasma 114 is formed causes the plasma 114 to experience heating. For example, the z-pinch 116 progresses through stages in which different heating mechanics dominate. For example, the z-pinch 116 may experience predominantly Ohmic heating during a first time period, predominantly adiabatic compression heating during a second time period, and predominantly alpha particle heating during a third time period. Particles within the z-pinch 116 undergo neutronic fusion reactions (e.g., thermonuclear neutronic fusion reactions) when a temperature of the z-pinch 116 is sufficiently high. In some examples, the neutronic fusion reactions release, produce, radiate, propagate, or generate neutrons at a rate between $10^{12}$ neutrons per second and $10^{18}$ (or more) neutrons per second.

Because the z-pinch 116 is formed from the neutron-producing fuel 106, the thermonuclear fusion reaction of particles in the z-pinch 116 releases, produces, radiates, propagates, or generates neutrons. As opposed to aneutronic fusion, more than 1% of the total energy released by the thermonuclear fusion reactions is carried by the neutrons N.

In some examples, the z-pinch 116 has a length of at least one meter. The probability that a particle of the z-pinch 116 will undergo fusion reaction increases as length of the z-pinch 116 increases. Thus, using a z-pinch 116 that has a length of at least one meter may result in the z-pinch 116 releasing, producing, radiating, propagating, or generating more neutrons than using a z-pinch that is shorter than one meter. In other examples, the z-pinch 116 has a length that is shorter than or longer than one meter.

In some examples, the number of neutrons released, produced, radiated, propagated, or generated by the z-pinch 116 of the neutron-producing fuel 106 is sufficient to make the neutron generator 100 suitable for use as a neutron source in a neutron radiography application. In these examples, the neutron generator 100 may be used as a neutron source for non-destructive testing or medical imaging. Examples of using the neutron generator 100 of FIG. 1 to perform neutron radiography are described in more detail below with reference to FIGS. 9 and 11.

Figure 2:
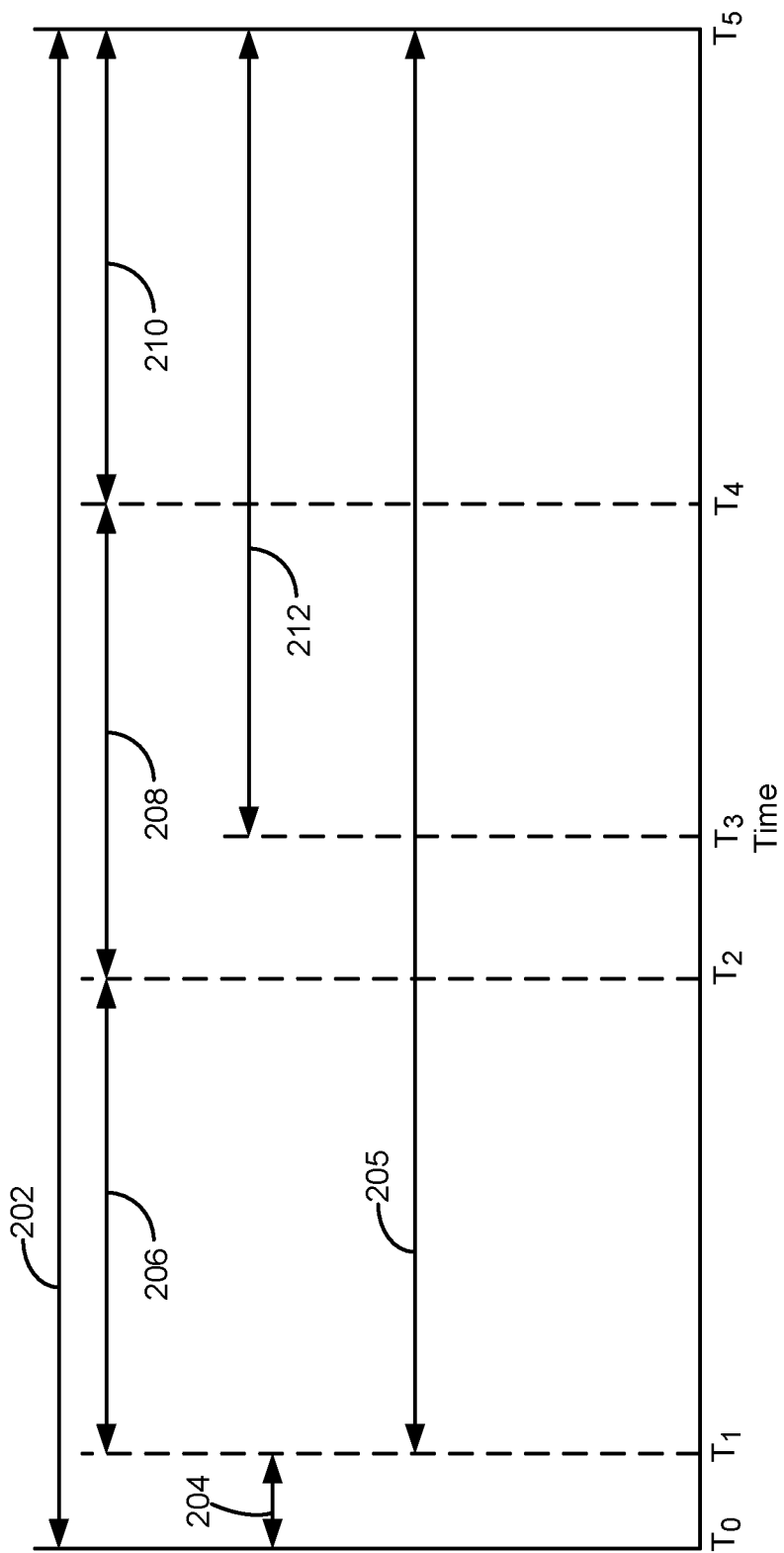
FIG. 2 illustrates a timing diagram illustrating heating mechanics of the z-pinch of FIG. 1.

FIG. 2 illustrates an example of a timing diagram during which the voltage differential described above with reference to FIG. 1 is applied to the inner and outer electrodes 108 and 110, respectively, of the plasma confinement device 104 of FIG. 1. The timing diagram of FIG. 2 illustrates a time period beginning subsequent to or concurrent with injection of the neutron-producing fuel 106 into the interior 140 of the outer electrode 110. In the example illustrated in FIG. 2, the voltage differential is applied (e.g., using voltage pulses) to the inner electrode 108 and the outer electrode 110 at T0. The voltage remains applied until T5 (represented by the time period 202). Additionally, the neutron-producing fuel 106 is injected into the outer electrode 110 at or prior to T0. At time T1, the z-pinch 116 forms within the outer electrode 110 as described above with reference to FIG. 1. The elapsed time between the application of the voltage T0 and formation of the z-pinch 116 at T1 is represented by the time period 204. The z-pinch 116 is maintained until T6 (e.g., is maintained for a period of time 205). In some examples, the gas 130 is injected into the outer electrode 110 during the time period 205 to achieve shear stabilization of the z-pinch 116, to fuel the z-pinch 116, or both. In some examples, the z-pinch 116 is maintained for greater than one second.

From time T1 to time T2 (e.g., during a time period 206 following generation of the z-pinch 116), the z-pinch 116 experiences primarily Ohmic heating due to a relatively low temperature (e.g., relatively high resistance) of the z-pinch 116. From time T2 to time T3, (e.g., during a second time period 208), heating due to adiabatic compression of the z-pinch 116 causes the z-pinch 116 to heat to a greater temperature than would be possible based on Ohmic heating alone. At time T3, the z-pinch 116 reaches a sufficient temperature to cause particles within the z-pinch 116 to experience thermonuclear neutronic fusion. Thermonuclear neutronic fusion of particles within the z-pinch 116 continues until time T5 (e.g., thermonuclear reaction occurs during the time period 212). Between a time T4 and a time T5 (e.g., during the time period 210), the z-pinch 116 experiences alpha particle heating and thermonuclear fusion reaction of particles within the z-pinch 116 continues.

FIGS. 3-7 illustrate neutron generation using an example of the neutron generator 100 of FIG. 1. In FIGS. 3-7, the neutron generator 100 includes a plasma confinement device 104 including hollow cylindrical outer and inner electrodes 110 and 108, respectively. The inner electrode 108 is located within the interior 140 of the outer electrode 110. In some examples, the inner electrode 108 is arranged (or positioned) along a central axis of the outer electrode 110.

Figure 3:
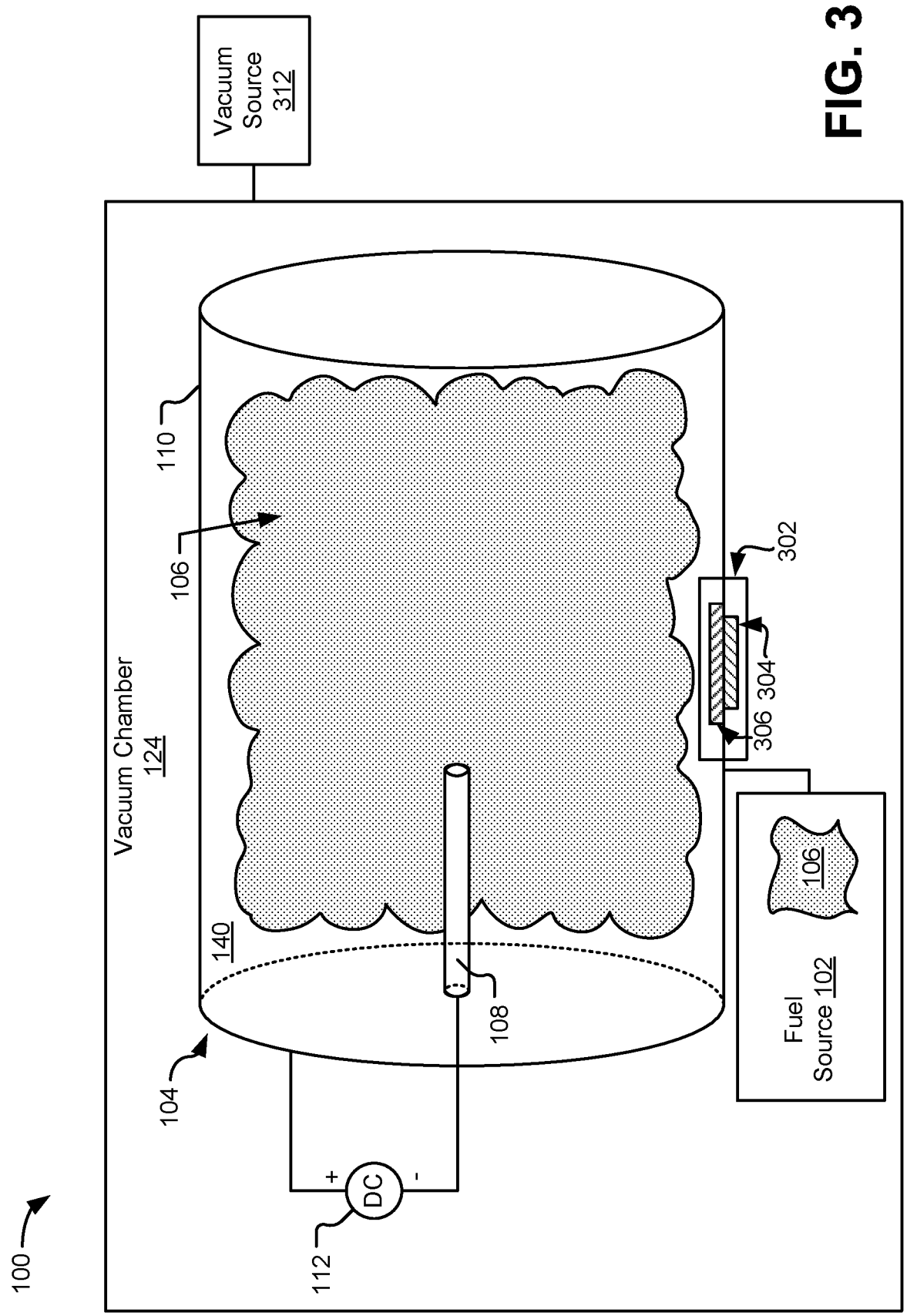
FIG. 3 illustrates a perspective view illustrating an example of the plasma confinement device of FIG. 1.

The neutron generator 100 of FIG. 3 may additionally include a neutron modifying medium 302. In some examples, the neutron modifying medium 302 corresponds to a neutron moderator 304 that at least partially surrounds the plasma confinement device 104. The neutron moderator 304 is configured to reduce a speed of neutrons (of the neutrons N) that strike the neutron modifying medium 302 (e.g., the neutron moderator 304), thereby converting the neutrons into thermal neutrons that are suitable for neutron radiography. In some examples, the neutron moderator 304 is configured to reduce an energy of the neutrons from energies on the order Mega electron volts (MeV) to energies on the order of kilo electron volts (keV) or electron volts (eV).

In other examples, the neutron modifying medium 302 corresponds to a medium that enhances a number of neutrons released, produced, radiated, propagated, or generated by the neutron generator 100. For example, in some implementations, the neutron modifying medium 302 corresponds to a medium that emits at least one gas of the neutron-producing fuel 106 when the neutron modifying medium 302 is struck by a neutron of the neutrons N of FIGS. 1 and 7. As another example, in some implementations, the neutron modifying medium 302 corresponds to a neutron doubler that doubles a neutron of the neutrons N that strikes the neutron modifying medium 302. In some examples in which the neutron modifying medium 302 enhances a number of neutrons released, produced, radiated, or generated by the neutron generator 100, the neutron modifying medium 302 is formed of or includes lithium. In some examples in which the neutron modifying medium 302 enhances a number of neutrons released, produced, radiated, propagated, or generated by the neutron generator 100, the neutron modifying medium 302 is a liner 306 (e.g., neutron enhancing liner) that is disposed on an inner surface of the outer electrode 110. In some examples, the neutron modifying medium 302 includes both the neutron enhancing liner 306 and the neutron moderator 304.

FIG. 3 illustrates the neutron-producing fuel 106 injected into an interior of the outer electrode 110 of an example of the neutron generator 100 of FIG. 1. FIG. 3 illustrates the neutron generator 100 during a time period before T0 of FIG. 2 or during a time period between T0 and T1. A vacuum source 312 is configured to draw a vacuum on vacuum chamber 124. The vacuum chamber 124 prevents or limits the introduction of atmospheric gases into the interior 140 of the outer electrode 110.

Figure 4:
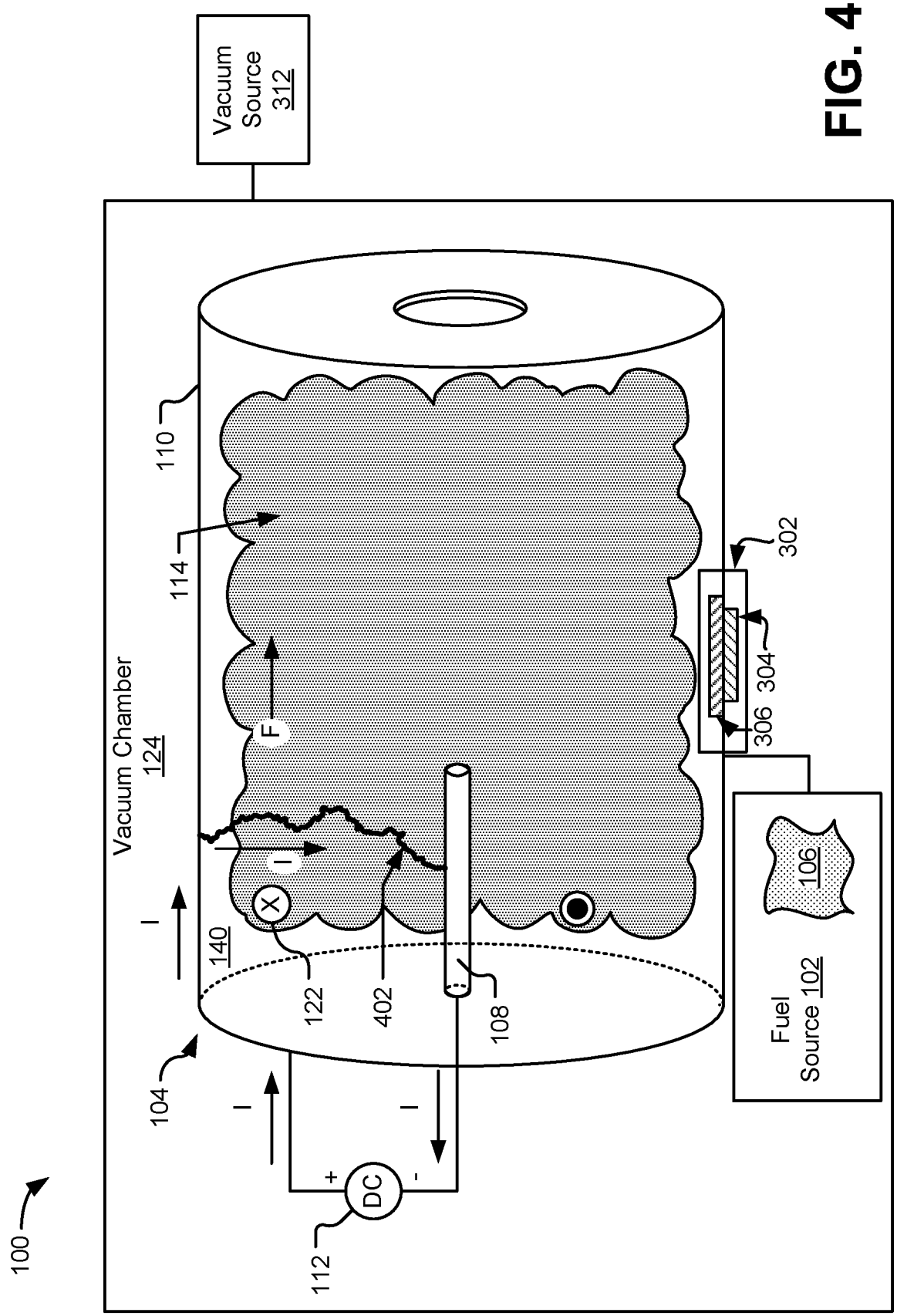
FIG. 4 illustrates an electric arc formed between an outer electrode and an inner electrode for the plasma confinement device of FIG. 3.
Figure 5:
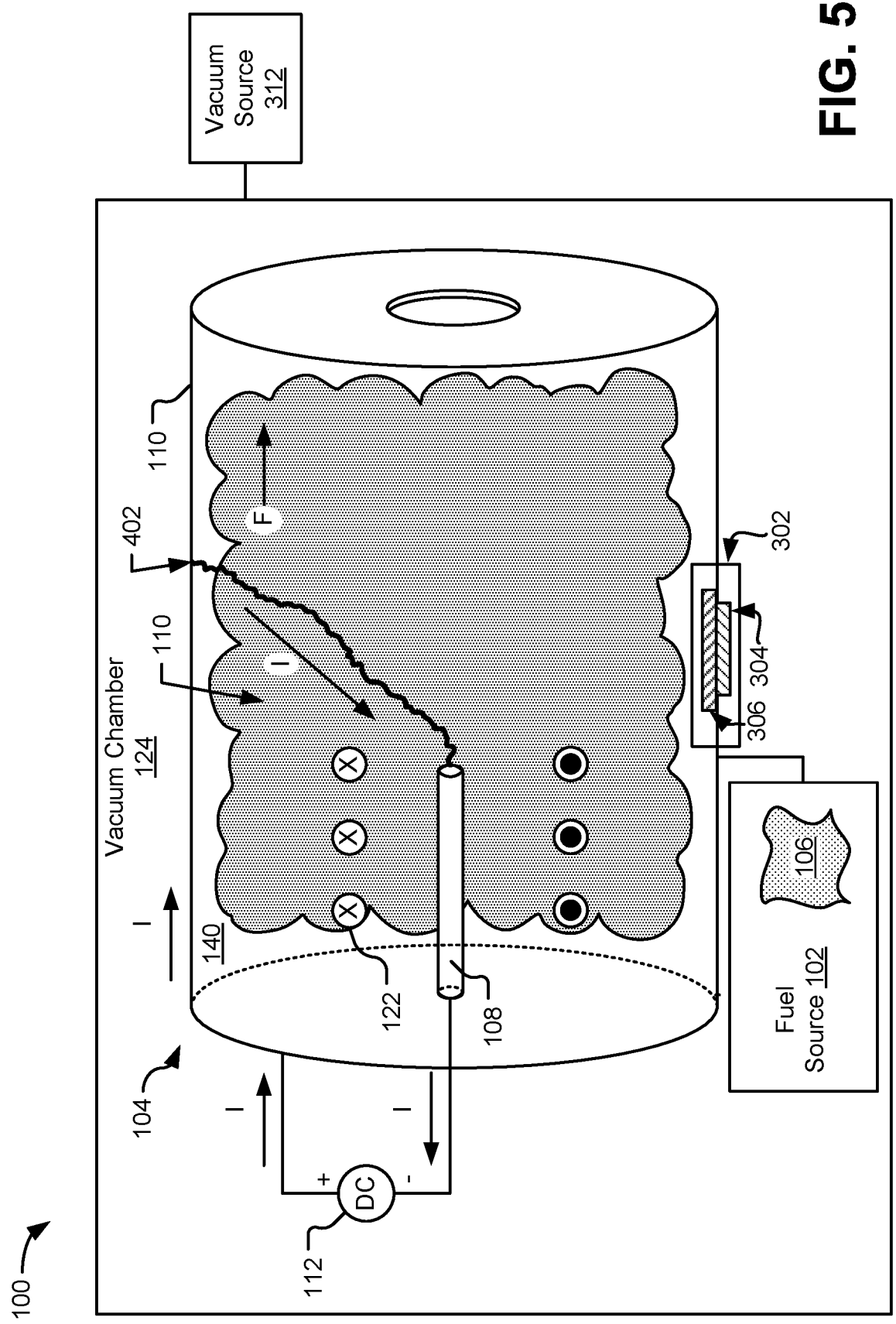
FIG. 5 illustrates the electric arc as it travels along an interior surface of the outer electrode of the plasma confinement device of FIG. 3.
Figure 6:
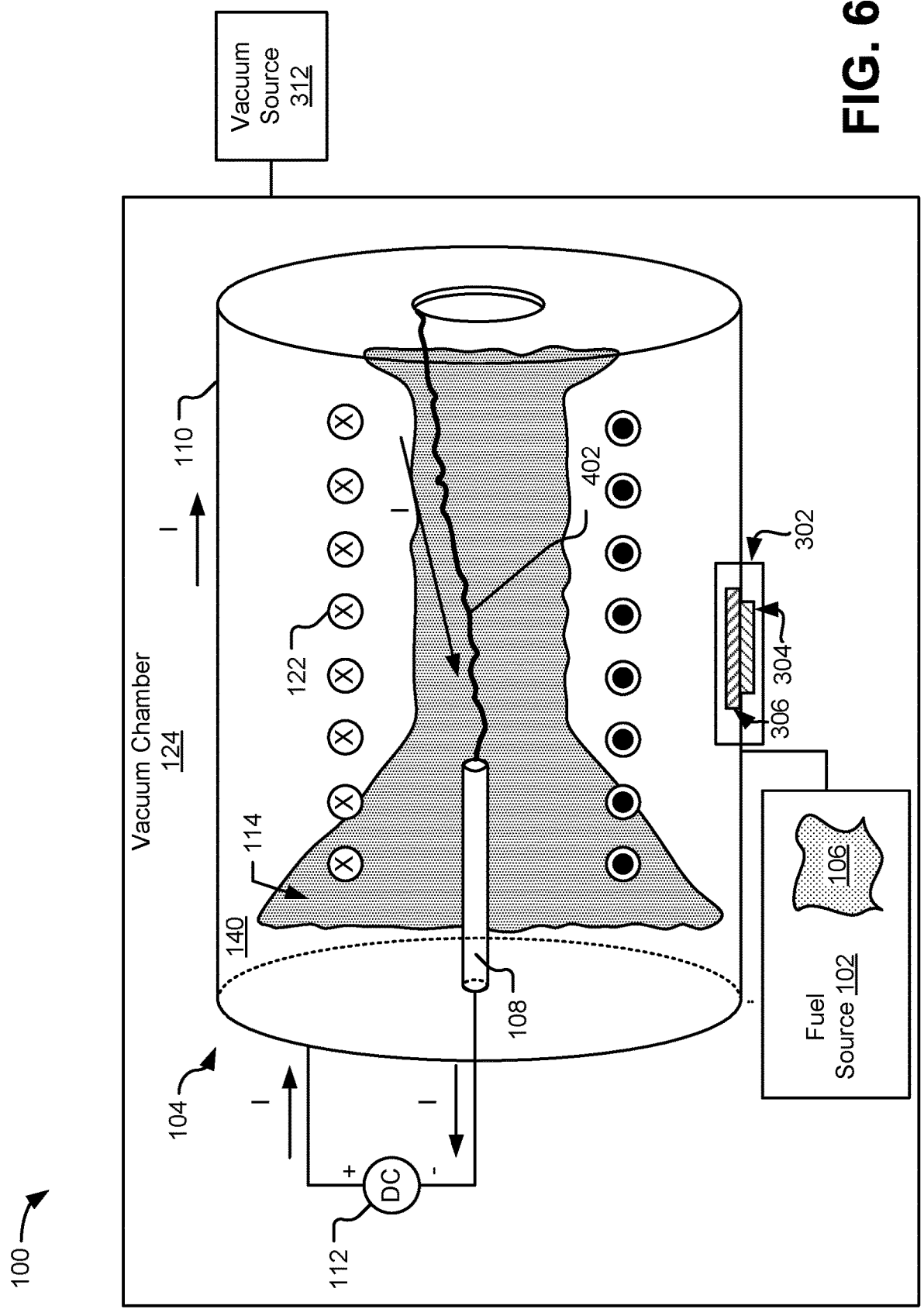
FIG. 6 illustrates an initial formation of a z-pinch.

FIGS. 4-6 illustrate the neutron generator 100 of FIG. 3 between initiation of application of the voltage differential (to the inner electrode 108 and the outer electrode 110) at time T0 of FIG. 2 and formation of the z-pinch 116 at time T1 of FIG. 2. In FIG. 4, an electric arc 402 is formed responsive to application of the voltage differential across the inner and outer electrodes 108 and 110, respectively. The voltage differential is sufficient to cause the electric arc 402 of FIG. 4 to form through the neutron-producing fuel 106. A current (I), supplied by the power supply 112, flows through the neutron-producing fuel 106 and along the electric arc 402 from the outer electrode 110 to the inner electrode 108, causing the neutron-producing fuel 106 of FIG. 3 within the outer electrode 110 to ionize into the plasma 114. The current I flowing through the electric arc generates a magnetic field 122. The Lorentz force (F) pushes the electric arc 402 in the direction indicated by the arrow in FIG. 4. The electric arc 402 travels along an interior surface of the outer electrode 110 in the direction of the Lorentz force (F). FIG. 5 illustrates the electric arc 402 as it travels along an interior surface 502 of outer electrode 110. In FIG. 6, the magnetic field 122 compresses the plasma 114 formed from the neutron-producing fuel 106 in the region between the inner electrode 108 and an end of the outer electrode 110. As the current I flows through the plasma 114, the strength of the magnetic field 122 increases.

Figure 7:
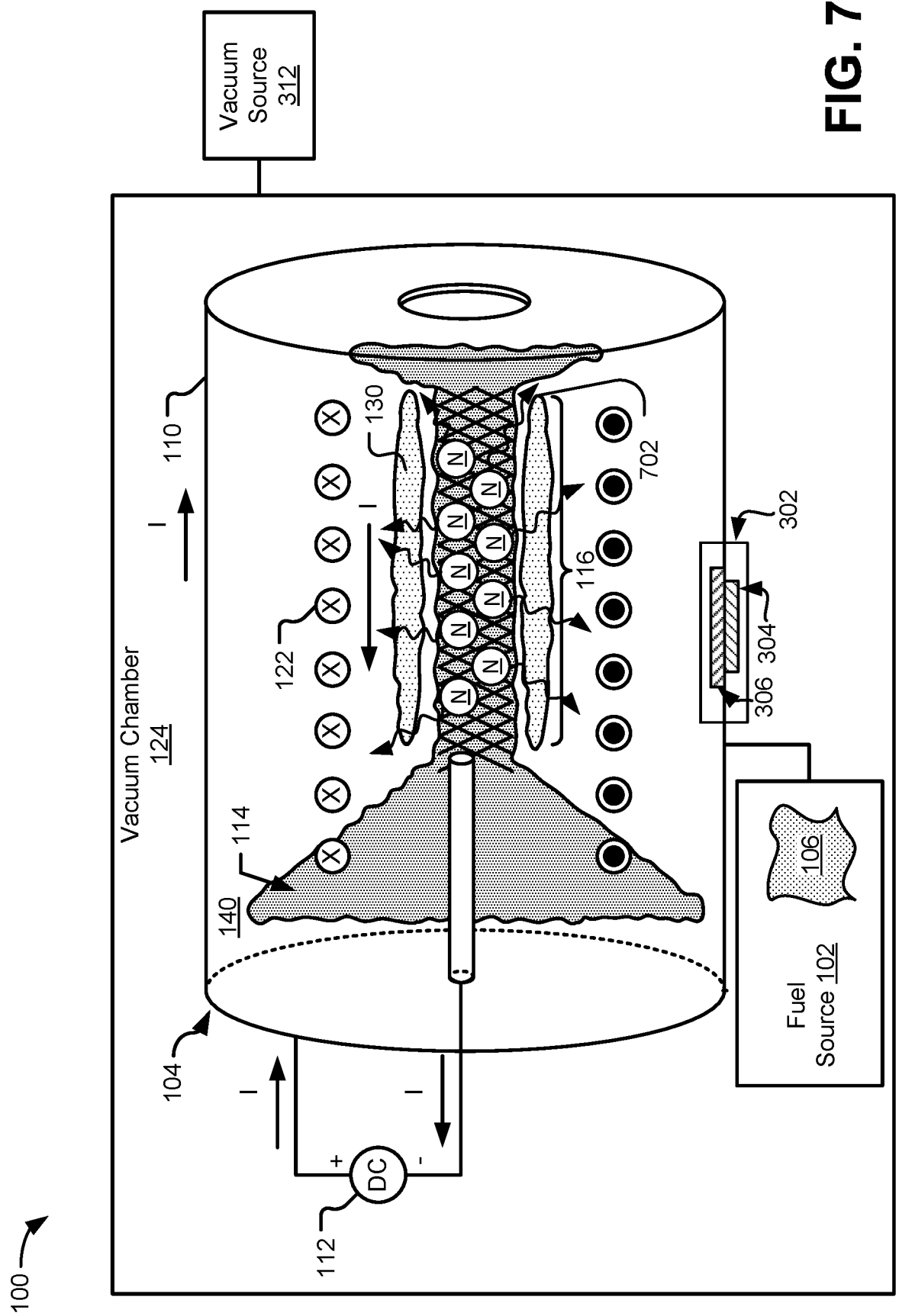
FIG. 7 illustrates the z-pinch of FIG. 1.

FIG. 7 illustrates the neutron generator 100 of FIG. 3 between time T3 and time T5 of FIG. 2. In FIG. 7, the neutrons N generated during neutronic fusion that occurs when the z-pinch 116 reaches a sufficient temperature as described above with reference to FIGS. 1 and 2. The gas 130 surrounds the z-pinch 116, providing flow stabilization to the z-pinch 116. For example, if the z-pinch 116 is a z-pinch, the z-pinch may be stabilized using a sheared flow of the gas 130 that surrounds the z-pinch.

Figure 8:
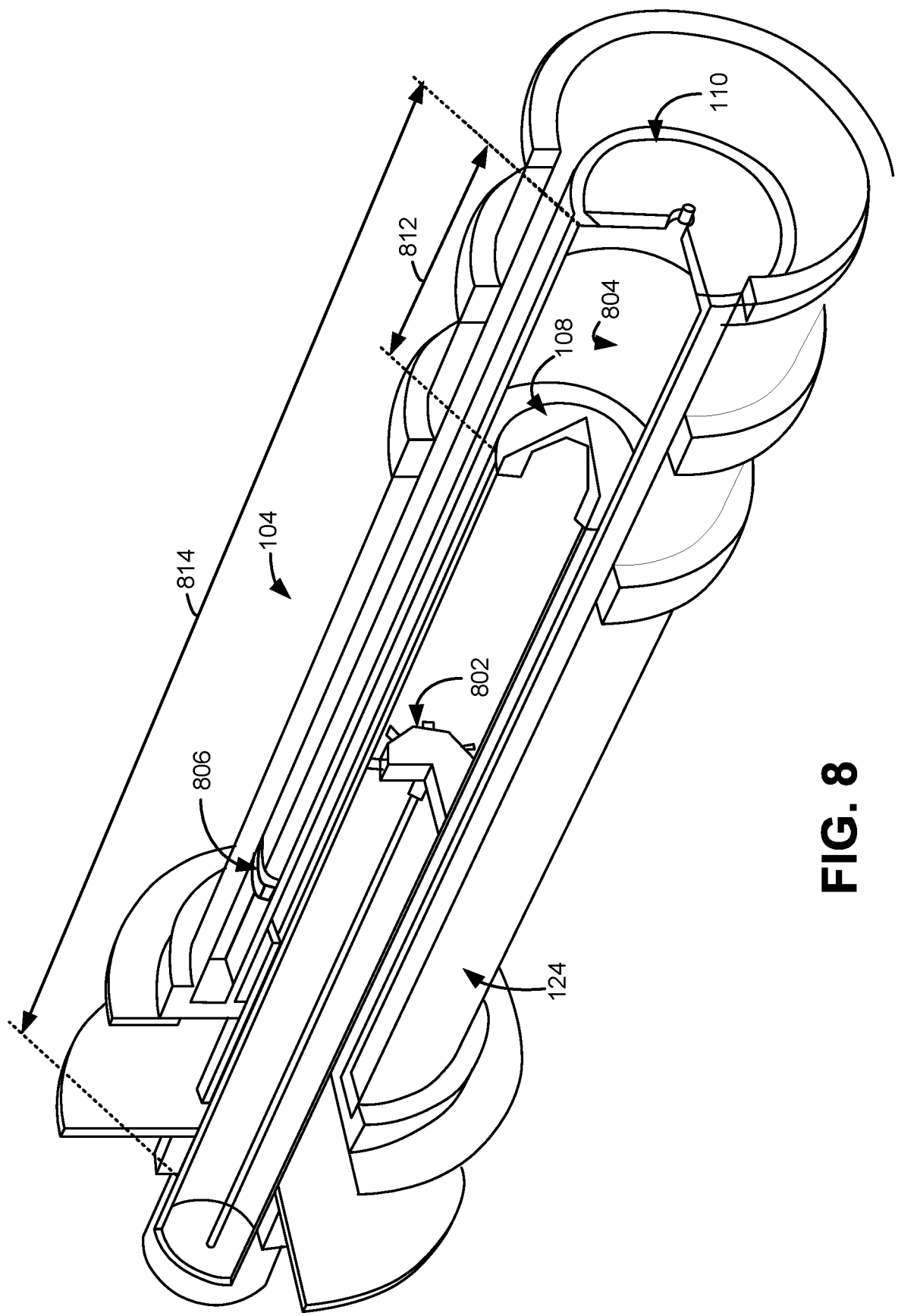
FIG. 8 illustrates a perspective view of an example of the plasma confinement device of FIG. 1.

FIG. 8 is an example of a plasma confinement device 104 of FIGS. 1 and 3-7. The plasma confinement device 104 of FIG. 8 includes circularly cylindrical inner and outer electrodes 108 and 110, respectively. The plasma confinement device 104 additionally includes an injector manifold 802 (e.g., including one or more valves, nozzles, or ports) within an interior of the inner electrode 108 to inject the neutron-producing fuel 106 of FIGS. 1 and 3-7 into an interior of the outer electrode 110. The plasma confinement device 104 additionally includes at least one port 806 to inject the gas 130 into an interior of the outer electrode 110 for flow stabilization as described above with reference to FIG. 1.

The plasma confinement device 104 of FIG. 8 includes a reaction chamber 804. In one embodiment, the reaction chamber 804 is an adjustable length reaction chamber that is disposed within an interior of the outer electrode 110. Optionally, the reaction chamber 804 has a fixed length. In some examples, a length 812 of the reaction chamber 804 is at least one meter. In other examples, the length 812 of the reaction chamber 804 is longer than or shorter than one meter. As an example, the length 812 of the reaction chamber 804 may be ten centimeters or may be at least on half meter (e.g., at least 0.5 m) in length. In the example illustrated in FIG. 8, the inner electrode 108 is movable along a length 814 of the outer electrode 110 to adjust the length 812 of the reaction chamber 804. Movement of the inner electrode 108 and adjustment of the length 812 can be accomplished using arrangements or techniques known or apparent to those skilled in the art upon reviewing the description. The length 812 of the reaction chamber 804 is generally associated with a length of the z-pinch 116. For example, a length of the z-pinch 116 generally increases as a length 812 of the reaction chamber 804 increases. As described above, a length of the z-pinch 116 is generally related to a rate of neutron production. For example, a longer z-pinch 116 generally produces more neutrons than a shorter z-pinch 116. Thus, in general, increasing the length 812 of the reaction chamber 804 will increase a length of the z-pinch 116, which will increase the rate at which the z-pinch 116 produces the neutrons N. Thus, the adjustable nature of the reaction chamber 804 enables the rate at which the plasma confinement device 104 produces neutrons to be adjusted.

Figure 9:
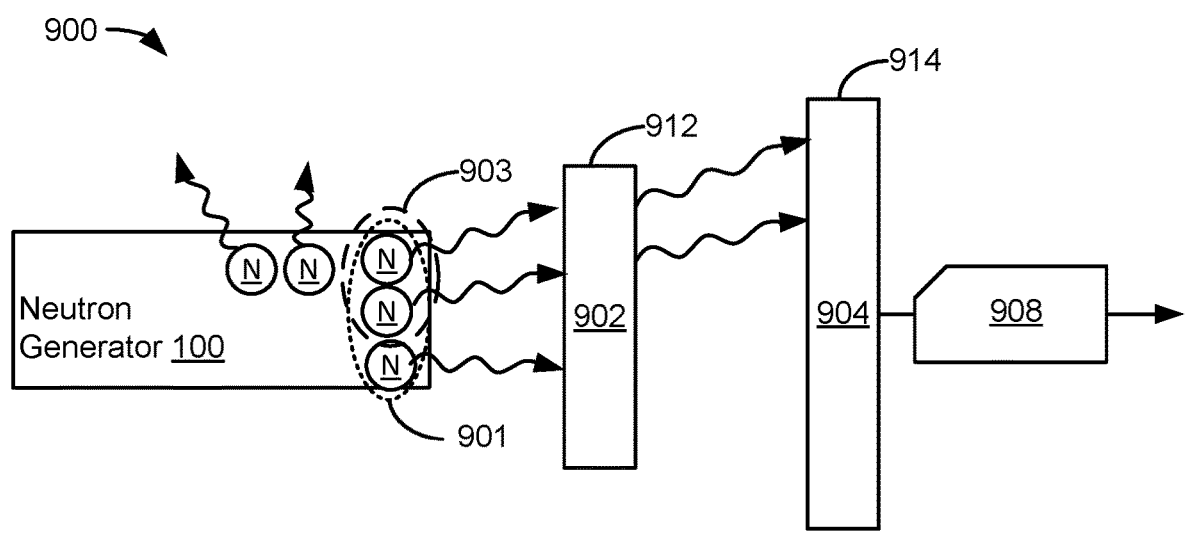
FIG. 9 illustrates a block diagram of a neutron radiography system that includes the neutron generator of FIG. 1.

FIG. 9 illustrates an example of a system 900 for performing neutron radiography using the neutron generator 100 of FIGS. 1, 3-7, and/or 8. The neutron generator 100 is configured to generate neutrons N that radiate away from the neutron generator 100. A first plurality 901 of the neutrons N are incident on a sample (e.g., a sample under test) 902. A second plurality 903 of the neutrons N propagates through the sample 902 and is incident on a detector 904. Differences between the number of neutrons N that propagate through various portions of the sample 902 indicate neutron attenuation properties of the sample 902. For example, in some implementations, first materials of the sample 902 strongly attenuate (e.g., scatter, absorb, etc.) neutrons while second materials of the sample 902 do not attenuate neutrons or attenuate neutrons less strongly. Thus, portions of the sample 902 that are formed of the second material will pass more of the neutrons N through to the detector 904 than portions of the sample 902 that are formed of the first material.

In some examples, the detector 904 includes a conversion screen [not illustrated] and a film [not illustrated]. The conversion screen is configured to convert the second plurality 903 of the neutrons N into high energy electrons that expose the film, producing an image 908. Because portions of the sample 902 that are formed of the second material propagate more of the neutrons N through to the detector 904, portions of the film corresponding to the second materials will be exposed to more electrons than portions of the film that correspond to the first materials. Thus, the film will be more exposed at portions of the film corresponding to the second materials than portions of the film corresponding to the first materials, resulting in an image that visually distinguishes the first and second materials.

Thus, the system 900 is configured to perform neutron radiography using a z-pinch neutron generator as a neutron source. As described above, the z-pinch neutron generator of the system 900 can generate between $10^{12}$ to $10^{18}$ (or more) neutrons per second, which may be a faster rate than the rate at which neutron sources that do not use plasma pinch neutron generators generate neutrons. Thus, the system 900 may be capable of imaging a sample faster than neutron radiography systems that employ neutron sources that do not use plasma pinch neutron generators.

Figure 10:
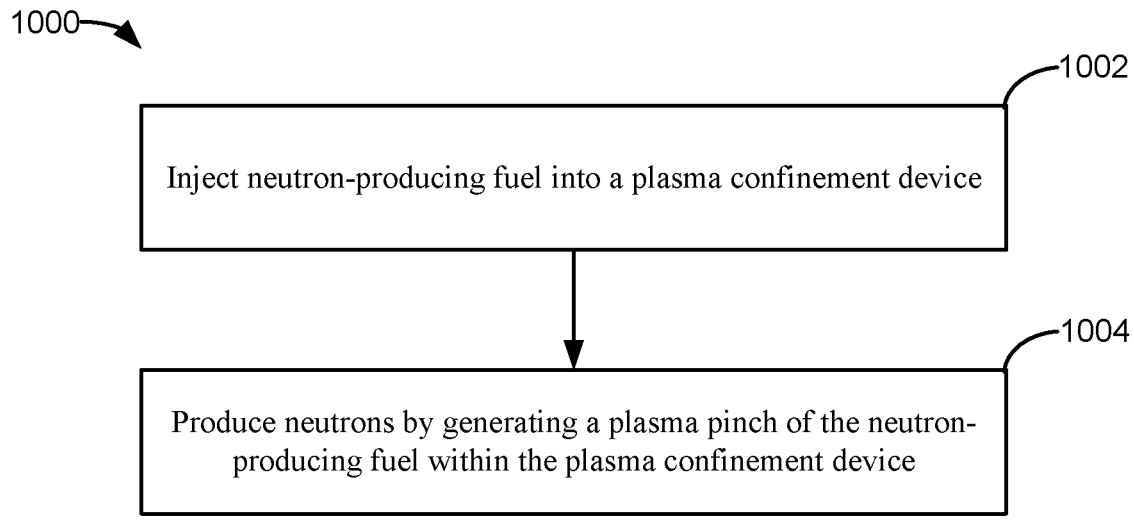
FIG. 10 illustrates a method of generating neutrons using the neutron generator of FIG. 1.

FIG. 10 illustrates a method 1000 of generating neutrons. In some implementations, the method 1000 of FIG. 10 is performed by the neutron generator 100 of FIGS. 1 and 3-7 (and/or using the plasma confinement device 104 of FIG. 8).

The method 1000 of FIG. 10 includes, at 1002, injecting neutron-producing fuel into a plasma confinement device. The neutron-producing fuel corresponds to the neutron-producing fuel 106 described above with reference to FIGS. 1-8 and the plasma confinement device corresponds to the plasma confinement device 104 of FIGS. 1, 3-7, and/or 8. The neutron-producing fuel 106 is provided by a fuel source, such as the fuel source 102 of FIGS. 1 and 3-7. In some examples, the neutron-producing fuel is injected into an interior of an outer electrode of the plasma confinement device. For example, the neutron-producing fuel is injected into an interior of the outer electrode 110 of FIGS. 1, 3-7, and/or 8. The neutron-producing fuel is injected into the plasma confinement device using or more manifolds, ports and/or valves. To illustrate, in some implementations, the neutron-producing fuel is injected into an interior of the outer electrode using the injector manifold 802 of FIG. 8. In other implementations, the neutron-producing fuel is injected into an interior of the outer electrode using valves and/or ports configured to feed the neutron-producing fuel into the outer electrode from outside of the outer electrode.

The method 1000 of FIG. 10 additionally includes, at 1004, producing neutrons by generating a z-pinch of the neutron-producing fuel within the plasma confinement device. The plasma confinement device generates the z-pinch 116 of FIGS. 1 and 7 subsequent to injection of the neutron-producing fuel into an interior of the outer electrode. The plasma confinement device operates in conjunction with the power supply to generate the z-pinch as described above with reference to FIGS. 1-8. For example, in some implementations, subsequent to injection of the neutron-producing fuel into the interior of the outer electrode, a controller [not illustrated] causes the power supply to apply the voltage differential across the inner and outer electrodes at a time corresponding to the beginning of the timing diagram of FIG. 2.

In some examples, producing the neutrons includes applying a voltage differential across the outer and inner electrodes that is sufficient to ionize the neutron-producing fuel into a plasma and to induce a current flow in the plasma as described above with reference to FIGS. 1-8. In some examples, producing the neutrons includes applying, to the inner and outer electrodes, the voltage differential using voltage pulses 162 and 164 of different durations or pulse lengths d1 and d2. For instance, in some examples, the method 1000 includes applying, to the inner and outer electrodes, a first voltage pulse 162 having a first pulse length d1 and a second voltage pulse 164 having a second pulse length d1 that is different than the first pulse length. In some examples, the first pulse length d1 is at least one millisecond. Reaction of the neutron-producing fuel 106 to application of the voltage differential across the inner and outer electrodes produces the plasma 114 and the z-pinch 116 as described above with reference to FIGS. 1-8. The different pulse lengths may be used to produce different amounts of neutrons. For example, the first voltage pulse 162 may be used to produce a first amount of neutrons and the second voltage pulse 164 may be used to produce a second amount of neutrons. Thus, the neutron generator may be tunable to produce different amounts of neutrons based on the voltage pulse that is applied to the neutron generator.

In some examples, the z-pinch is maintained during a duration of application of the voltage to the inner and outer electrodes. In some examples, the voltage differential is applied for a duration greater than one second. In these examples, the z-pinch is maintained for a duration greater than one second. In some examples, the method 1000 includes injecting a gas to provide sheared flow stabilization to the z-pinch as described above with reference to FIGS. 1-8.

The z-pinch experiences sufficient heating to cause particles of the z-pinch to undergo a thermonuclear fusion reaction, thereby releasing, producing, radiating, propagating, or generating neutrons. Thus, at least some neutrons are released by particles of the z-pinch that undergo thermonuclear fusion. In some examples, the neutrons are released, produced, radiated, propagated, or generated at a rate between $10^{12}$ neutrons per second and $10^{18}$ neutrons per second.

In some examples, the method 1000 additionally includes moderating an energy level of neutrons released, produced, radiated, propagated, or generated by the z-pinch using a neutron moderator that at least partially surrounds the plasma confinement device. For example, in some implementations, the neutron moderator corresponds to the neutron modifying medium 302 described above with reference to FIG. 3.

Figure 11:
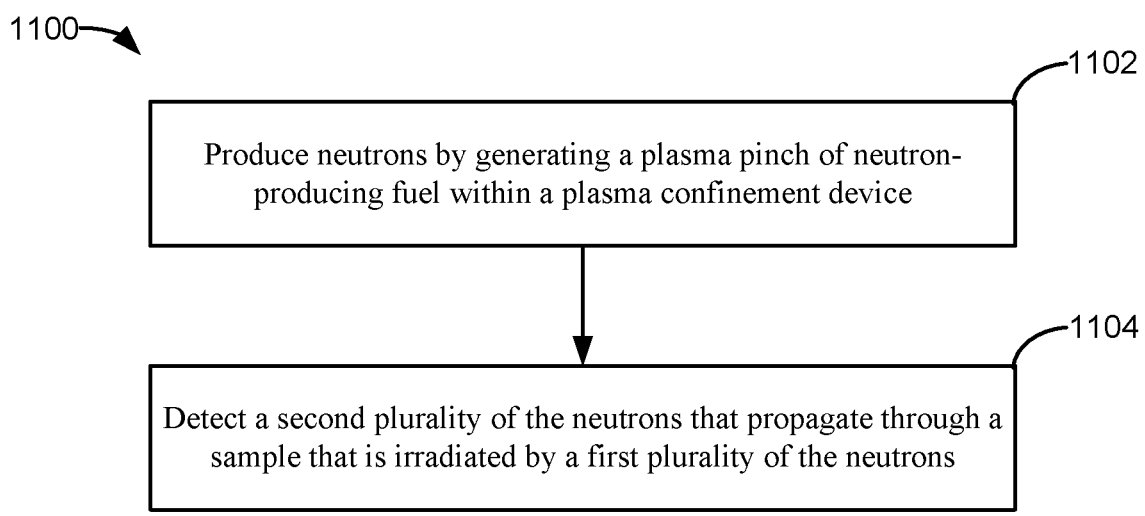
FIG. 11 illustrates a method of performing neutron radiography using the neutron generator of FIG. 1 as a neutron source.

FIG. 11 illustrates a method 1100 of performing neutron imaging using neutrons released, produced, radiated, propagated, or generated from a z-pinch. In some implementations, the method 1100 of FIG. 11 is performed using the neutron generator 100 of FIGS. 1 and 3-7 (and/or using the plasma confinement device 104 of FIG. 8) and a detector, such as the detector 904 of FIG. 9.

The method 1100 includes, at 1102, producing neutrons by generating a z-pinch of neutron-producing fuel within a plasma confinement device. The plasma confinement device corresponds to the plasma confinement device 104 of FIGS. 1, 3-7, and/or 8, and the z-pinch is generated from a neutron-producing fuel as described above with reference to the z-pinch 116 of FIGS. 1 and 7.

The method 1100 additionally includes, at 1104, detecting a second plurality of the neutrons that propagate through a sample that is irradiated by a first plurality of the neutrons. Detecting the second plurality of neutrons enables determination of neutron attenuation properties of the sample. In some examples, the sample is placed between the neutron generator 100 of FIG. 1 and a detector. The sample is then irradiated with the first plurality of neutrons. One or more characteristics of the second plurality of neutrons incident at the detector are indicative of neutron attenuation properties of the sample. In some examples, the detector includes a conversion screen and a film. The conversion screen converts the second plurality of neutrons into high energy electrons that expose the film, producing an image of the sample.

Thus, the method 1100 includes performing neutron radiography using a z-pinch neutron generator as a neutron source. As described above, the z-pinch neutron generator of the system 900 can generate between $10^{12}$ to $10^{18}$ neutrons per second, which may be a faster rate than the rate at which neutron sources that do not use z-pinch neutron generators generate neutrons. Thus, the method 1100 is capable of imaging a sample faster than imaging methods that employ neutron radiography systems that do not use a z-pinch neutron generator as a neutron source.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A neutron radiography neutron generator, comprising:
   a power supply;
   a flow stabilizing gas source;
   a fuel source; and
   a plasma confinement device coupled to the fuel source, the plasma confinement device comprising:
   an outer electrode;
   an inner electrode, a portion of the inner electrode positioned in the outer electrode;
   a reaction chamber in a portion of an interior of the outer electrode that extends past an end of the inner electrode, wherein application of a voltage difference between the inner electrode and the outer electrode by the power supply is configured to generate a z-pinch of neutron-producing fuel in the reaction chamber, the neutron-producing fuel provided from the fuel source, wherein gas flow from the flow stabilizing gas source causes the z-pinch to be a sheared-flow stabilized z-pinch, and wherein at least a portion of the neutron-producing fuel in the z-pinch reacts to generate neutrons at a rate greater than 10 to the twelfth power neutrons per second; and a neutron modifying medium at least partially surrounding the plasma confinement device to reduce a speed of at least a portion of the neutrons to a speed suitable for neutron radiography.

2. The neutron radiography neutron generator of claim 1, further comprising a vacuum chamber, wherein at least a portion of the plasma confinement device is positioned in the vacuum chamber.

3. The neutron radiography neutron generator of claim 1, wherein the neutron-producing fuel includes deuterium, tritium, or both.

4. The neutron radiography neutron generator of claim 1, wherein the gas flow is introduced via a port in the outer electrode.

5. The neutron radiography neutron generator of claim 1, wherein application of the voltage difference is configured to generate a plasma from at least a portion of the neutron-producing fuel.

6. The neutron radiography neutron generator of claim 1, further comprising an injector manifold in an interior of the inner electrode, the injector manifold configured to introduce the neutron-producing fuel from the fuel source into a region between the inner electrode and the outer electrode.

7. The neutron radiography neutron generator of claim 1, further comprising a neutron enhancing liner disposed on an inner surface of the outer electrode.

8. The neutron radiography neutron generator of claim 1, wherein a length of the reaction chamber is at least one half meter.

9. The neutron radiography neutron generator of claim 1, wherein a length of the reaction chamber is between 10 centimeters and 1 meter.

10. The neutron radiography neutron generator of claim 1, wherein the power supply comprises one or more of a fission reactor, a battery, a capacitor bank, or a flywheel energy storage device.

11. The neutron radiography neutron generator of claim 1, wherein application of the voltage difference is configured to ionize the neutron-producing fuel into a plasma and to induce a current flow in the plasma.

12. The neutron radiography neutron generator of claim 1, wherein the power supply is configured to apply the voltage difference using voltage pulses having different pulse lengths, the different pulse lengths configured to generate different amounts of neutrons.

13. The neutron radiography neutron generator of claim 12, wherein at least one of the different pulse lengths is about one millisecond.

14. The neutron radiography neutron generator of claim 1, wherein the fuel source comprises a wire or a wire array disposed within the plasma confinement device.

15. The neutron radiography neutron generator of claim 14, wherein application of the voltage difference causes a current to flow through the fuel source that vaporizes at least a portion of the fuel source to provide the neutron-producing fuel.

16. The neutron radiography neutron generator of claim 1, wherein a least a portion of the gas flow comprises neutron-producing fuel.

17. The neutron radiography neutron generator of claim 1, wherein application of the voltage difference is further configured to:
ionize the neutron-producing fuel into a plasma; and
compress the plasma by a magnetic field induced by current flowing through the plasma to form the z-pinch.

18. A method of generating neutrons from a neutron radiography neutron generator, the method comprising:
introducing a neutron-producing fuel from a fuel source into a plasma confinement device, the plasma confinement device comprising an outer electrode; an inner electrode, wherein a portion of the inner electrode is positioned in the outer electrode; a reaction chamber on an inner side of the outer electrode, wherein the reaction chamber starts at an end of the inner electrode, and a neutron modifying medium at least partially surrounding the plasma confinement device to reduce a speed of at least a portion of neutrons generated in the reaction chamber to a speed suitable for neutron radiography;
applying a voltage difference to the inner electrode and the outer electrode from a power supply to generate a z-pinch of the neutron-producing fuel in the reaction chamber, wherein the z-pinch causes at least a portion of the neutron-producing fuel to heat and react to generate neutrons at a rate greater than 10 to the twelfth power neutrons per second; and
introducing a gas flow from a flow stabilization gas source via a port in the outer electrode to cause the z-pinch to be a sheared-flow stabilized z-pinch.

19. The method of claim 18, wherein at least some of the neutrons are produced by a thermonuclear fusion reaction.

20. The method of claim 18, wherein the neutron-producing fuel includes deuterium, tritium, or both.

21. The method of claim 18, wherein the applying the voltage difference ionizes the neutron-producing fuel to a plasma and induces a current in the plasma that generates a magnet field that produces the z-pinch.

22. The method of claim 18, wherein the gas flow comprises the neutron producing fuel.

23. The method of claim 18, wherein the introducing the neutron-producing fuel comprises vaporizing a wire or wire mesh in the plasma confinement device by application of the voltage difference.

24. The method of claim 18, wherein the introducing the neutron-producing fuel comprises injecting the neutron-producing fuel through an injection manifold in the inner electrode to introduce the neutron-producing fuel into a region between the outer electrode and the inner electrode.

25. A neutron generator for neutron radiography, comprising:
a power supply;
a flow stabilizing gas source;
a fuel source; and
a plasma confinement device coupled to the fuel source, the plasma confinement device comprising:
an outer electrode;
an inner electrode, a portion of the inner electrode positioned in the outer electrode;
a reaction chamber in a portion of an interior of the outer electrode that extends past an end of the inner electrode, wherein application of a voltage difference between the inner electrode and the outer electrode by the power supply is configured to generate a z-pinch of neutron-producing fuel in the reaction chamber, the neutron-producing fuel provided from the fuel source, wherein gas flow from the flow stabilizing gas source introduced into the reaction chamber via a port in the outer electrode causes the z-pinch to be a sheared-flow stabilized z-pinch, and wherein at least a portion of the neutron-producing fuel in the z-pinch reacts to generate neutrons at a rate greater than 10 to the twelfth power neutrons per second; and a neutron modifying medium at least partially surrounding the plasma confinement device to reduce a speed of at least a portion of neutrons generated in the reaction chamber to a speed suitable for neutron radiography.

26. The neutron generator of claim 25, wherein the neutron-producing fuel includes deuterium, tritium, or both.

27. The neutron generator of claim 25, wherein the gas flow comprises the neutron-producing fuel.

* * * * *